(12) United States Patent
Timmermann et al.

(10) Patent No.: US 9,168,879 B2
(45) Date of Patent: Oct. 27, 2015

(54) SEALING ARRANGEMENT FOR VEHICLE WINDOWS, METHOD FOR THE PRODUCTION THEREOF, AND USE THEREOF

(71) Applicant: SAINT-GOBAIN GLASS FRANCE, Courbevoie (FR)

(72) Inventors: Alwin Timmermann, Cologne (DE); Heinz-Erich Dickers, Herzogenrath (DE); Andreas Behrens, Huertgenwald (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/371,167

(22) PCT Filed: Jan. 23, 2013

(86) PCT No.: PCT/EP2013/051179
§ 371 (c)(1),
(2) Date: Jul. 8, 2014

(87) PCT Pub. No.: WO2013/120671
PCT Pub. Date: Aug. 22, 2013

(65) Prior Publication Data
US 2014/0346803 A1    Nov. 27, 2014

(30) Foreign Application Priority Data
Feb. 13, 2012    (EP) .................................. 12155069

(51) Int. Cl.
*B60J 10/02*    (2006.01)
*B60R 13/06*    (2006.01)
(Continued)

(52) U.S. Cl.
CPC . *B60R 13/06* (2013.01); *B60J 1/02* (2013.01); *B60J 10/0011* (2013.01);
(Continued)

(58) Field of Classification Search
CPC ............... B60J 10/0017; B60J 10/0022; B60J 10/0054; B60J 10/0062; B60J 10/0065; B60J 10/02
USPC ............................. 296/93, 201, 84.1, 146.15
See application file for complete search history.

(56) References Cited

U.S. PATENT DOCUMENTS

| | | | |
|---|---|---|---|
| 4,950,019 A | * | 8/1990 | Gross .............................. 296/93 |
| 5,139,846 A | * | 8/1992 | Herwegh et al. .............. 428/119 |

(Continued)

FOREIGN PATENT DOCUMENTS

| | | |
|---|---|---|
| DE | 102008050130 | 4/2010 |
| DE | 102009026369 | 3/2011 |

(Continued)

OTHER PUBLICATIONS

PCT Written Opinion mailed on Mar. 28, 2013 for PCT Application PCT/EP2013/051179 filed on Jan. 23, 2013 in the name of Saint-Gobain Glass France (English Translation + German Original).

(Continued)

*Primary Examiner* — Gregory Blankenship
(74) *Attorney, Agent, or Firm* — Steinfl & Bruno LLP (57) ABSTRACT

A sealing arrangement for vehicle windows is described. The sealing arrangement has at least a holding rail that has a locking channel, which is formed by a guide rail and a resilient leg, and is fastened to a window and a cover that has a guide channel, which is formed by a locking rail and a positioning stop. The guide rail is arranged in the guide channel and the locking rail is latched in the locking channel. A locking hook is latched onto the resilient leg in a projecting region of the locking rail and a resilient element is clamped in the guide channel between a stop face on the underside of the cover and the guide rail.

19 Claims, 11 Drawing Sheets

(51) Int. Cl.
*B60J 10/00* (2006.01)
*B60J 1/02* (2006.01)

(52) U.S. Cl.
CPC ......... *B60J 10/0014* (2013.01); *B60J 10/0062* (2013.01); *B60J 10/0071* (2013.01); *B60J 10/02* (2013.01); *Y10T 29/49863* (2015.01)

(56) References Cited

U.S. PATENT DOCUMENTS

| | | | |
|---|---|---|---|
| 5,950,976 A * | 9/1999 | Shibata | 248/309.1 |
| 6,722,731 B2 | 4/2004 | Conils et al. | |
| 6,769,700 B2 * | 8/2004 | Ortmuller et al. | 277/642 |
| 8,251,432 B2 * | 8/2012 | Schaff et al. | 296/93 |
| 8,434,267 B2 * | 5/2013 | Bocutto | 49/479.1 |
| 8,444,205 B2 * | 5/2013 | Flammer et al. | 296/93 |
| 8,628,137 B2 | 1/2014 | Platt et al. | |
| 2014/0346803 A1 * | 11/2014 | Timmermann et al. | 296/93 |
| 2014/0367989 A1 * | 12/2014 | Erner | 296/84.1 |

FOREIGN PATENT DOCUMENTS

| | | |
|---|---|---|
| EP | 1240041 | 9/2002 |
| EP | 1280675 | 2/2003 |
| EP | 2123497 | 11/2009 |
| FR | 2952900 | 5/2011 |

OTHER PUBLICATIONS

PCT International Search Report mailed on Mar. 28, 2013 for PCT Application PCT/EP2013/051179 filed on Jan. 23, 2013 in the name of Saint-Gobain Glass France (English Translation + German Original).

* cited by examiner

SEALING ARRANGEMENT FOR VEHICLE WINDOWS, METHOD FOR THE PRODUCTION THEREOF, AND USE THEREOF

CROSS REFERENCE TO RELATED APPLICATIONS

The present application is the US national stage of International Patent Application PCT/EP2013/051179 filed on Jan. 23, 2013 which, in turn, claims priority to European Patent Application EP 12155069.3 filed on Feb. 13, 2012.

The invention relates to a sealing arrangement for motor vehicle panes and a method for the production thereof as well use thereof according to the generic portions of the independent claims.

In modern motor vehicles, a large area panel that extends the outer surface of the windshield under the hood is frequently mounted on the bottom edge of the windshield. For the sake of handlability during installation, logistics, and accessibility during maintenance work, for example, on the windshield wiper system, the panel is detachably connected to the windshield. For this purpose, a profile, usually produced by extrusion, that includes devices for locking with a mating locking hook on the panel is mounted on the windshield. Such profiles are known, for example, from EP 1 240 041 B1. In addition, such panels are increasingly attached flush on the windshield, which further restricts the mounting space available.

A sealing arrangement for motor vehicle panes for the bottom region of a motor vehicle windshield, which is sealingly locked via a holding rail to a water box cover is known from EP 1 280 675 B1. The holding rail has a seal that is arranged between the bottom edge of the pane and the top edge of the water draining chamber cover and that ends substantially flush with its outer surface. This arrangement has, however, the disadvantage that only very small manufacturing tolerances are permitted for properly functioning latching and sealing. However, it is also possible to arrange such a seal such that it is not visible, as is known from DE 10 2009 026 369 A1.

To reduce the locking forces, a soft lip has, for example, been used that enables latching with mating undercuts of a locking hook with a low level of force on the panel, as is known from EP 2 123 497 A1. The soft lip has the disadvantage of only low positioning accuracy of the cover.

The object of the present invention is to make available an improved sealing arrangement for motor vehicle panes, whereby lower forces are necessary for properly functioning latching and, at the same time, greater positioning accuracy is enabled, while overcoming the disadvantages of the prior art with the simplest and most economical means possible.

The objects of the invention are accomplished through the characteristics of the independent claims 1, 13, and 16. Advantageous embodiments of the invention are reported through the characteristics of the subclaims.

The object of the invention is accomplished by a sealing arrangement for motor vehicle panes that comprises at least the following characteristics:
  a holding rail having a locking channel that is formed by a guide rail and a resilient leg and the holding rail is fastened to a pane,
  a cover having a guide channel that is formed by a locking rail and a positioning stop,
  wherein
  the guide rail is arranged in the guide channel and the locking rail is latched in the locking channel,
  a resilient element is clamped in the guide channel between a stop face on the underside of the cover and the guide rail.

The locking of the locking rail in the locking channel takes place via a locking hook on the resilient leg that is latched into a projecting region of the locking rail.

The object of the invention is further accomplished by a method for producing a sealing arrangement, wherein at least:
  the holding rail is durably bonded to the pane,
  the guide rail of the cover is introduced into the guide channel of the holding rail, and a defined position is created between the rear edge of the cover and the bottom edge of the pane,
  the cover with the locking rail is pressed into the channel beyond the locking hook under tensioning of the resilient element between the guide rail and the stop face on the underside of the cover,
  the cover moves back under relaxation of the resilient element and the locking hook is latched into the projecting region of the locking rail.

Thus, the position of the cover relative to the holding rail and the pane attached thereon is defined by the guide rail and the guide channel. The guide channel is designed in the shape of a funnel by a suitable shape of the positioning stops and of the locking rail such that the guide rail arrives in a defined position.

The locking mechanism consisting of the locking rail and the locking channel forms a durable connection of the cover and the holding rail that is detachable again only with a high expenditure of force. The locking mechanism prevents detachment of the cover counter to the assembly direction in which the cover is guided onto the holding rail. The resilient leg and the locking hook arranged thereon are stressed by the resilient element only with a tensile stress and can, consequently, be designed very thin and delicate. As a result of the fixed positioning of the guide rail in the guide channel, the locking mechanism does not have to absorb any transverse forces relative to the assembly direction.

In an advantageous embodiment of the invention, the holding rail is bonded to the pane by an adhesive connection. The adhesive connection is preferably applied on the holding rail as an adhesive film or an adhesive bead. Customary thicknesses of adhesive films are 0.3 mm to 2 mm.

The cover and/or the holding rail preferably contain a polymer, particularly preferably polypropylene, polyvinyl chloride, acrylonitrile butadiene styrene, copolymers, and/or mixtures. The cover and/or the holding rail are preferably made from polypropylene.

In a preferred embodiment of the invention, the resilient element is fixedly connected to the guide rail of the holding rail. It is particularly preferably glued onto the guide rail, extruded thereon, and/or introduced as a prefabricated sealing profile into a corresponding groove. In an alternative preferred embodiment, the resilient element is bonded to the stop face of the cover. Here again, it is preferably glued onto the stop face, produced by extrusion, and/or introduced as a prefabricated sealing profile into a corresponding groove.

The resilient element is advantageously implemented as a solid material, as a hollow chamber profile, or as a U-shaped profile. The resilient element can have any shapes that achieve a sealing and resilient effect in the sealing arrangement according to the invention. The resilient element can preferably have a round, oval, rectangular, or V-shaped profile cross-section.

The pressure necessary for the spring effect and seal between the stop face of the cover and the guide rail of the holding rail is generated by an elastic deformation of the resilient element. For the designing of the spring characteristic, the material, the shape, the wall thickness in the case of hollow chamber profile, as well as the volume of the resilient element, in particular, are coordinated. At the same time, the resilient element serves as a sealing element, for example, for sealing against moisture such as rain or snow.

In a preferred embodiment, the resilient element according to the invention contains elastomers, thermoplastic elastomers, and preferably ethylene propylene diene rubber, styrene butadiene rubber, polybutadiene rubber, nitrile rubber, chloroprene rubber, fluorine rubber, silicone rubber, polypropylene, polyvinyl chloride, acrylonitrile butadiene styrene, copolymers, and/or mixtures thereof.

The sealing arrangement seals the motor vehicle hull chiefly against moisture such as rain and snow as well as any types of pollutants from the environment. In effect, the arrangement can also influence the shape, the reduction of wind noises, as well as the propagation of vibrations of the motor vehicle hull.

In an advantageous embodiment of the invention, the angle $\alpha$ between the positioning stop and the perpendicular to the stop face is from 0° to 45°, preferably from 2° to 25°. The wedge shape thus formed has the particular advantage that the guide rail is guided into its desired position by means of the force of the resilient element along the positioning stop. This has the particular advantage that the tolerance transverse to the installation direction is significantly reduced.

The length of the positioning stop is advantageously from 1 mm to 6 mm, preferably from 2 mm to 4 mm. The positioning stop is preferably implemented long enough that the guide rail is introduced into the guide channel before the locking rail arrives in the locking channel.

In an advantageous embodiment, the cover according to the invention has at least one assembly stop. The assembly stop is arranged on the positioning stop. The assembly stop is preferably longer than the positioning stop, preferably by more than 50%, and particularly preferably by more than 100%. The assembly stop is preferably inclined further in the direction of the guide channel. The assembly stop ensures that the guide rail and the guide channel as well as the locking rail and the locking channel are arranged relative to each other such that they slide into one another with a positive fit upon lowering the cover onto the holding rail. In particular, this prevents the locking rail from being introduced outside the locking channel and between the resilient leg and the pane, which can result in deformation and destruction of the resilient leg.

In a preferred embodiment, the cover has three to seven and, in particular, three assembly stops. The assembly stops are preferably arranged in the end region along the long direction of the cover and in the center. The outer assembly stops are preferably arranged at a distance of less than 20% of the length of the cover from the ends of the cover. This enables a particularly simple insertion of the guide rail into the guide channel and of the locking rail into the locking channel. This is true especially when the assembly starts, as is customary, on one of the two ends of the cover or in the center.

The locking hook and the projecting region can be arbitrarily oriented in the locking channel. In a preferred embodiment, the locking hook is mounted on the side of the locking channel on the resilient leg facing away from the pane, and the projecting region of the locking rail faces toward the pane.

The resilient leg is deflectably connected to the cover. Here, "deflectably" mean that the resilient leg can be deflected at the connection point to the holding rail, for example, in the latching process, without the holding rail breaking off or being permanently deformed. Alternatively or additionally, the resilient leg can be designed flexibly and can be reversibly deformed in part or over its entire length.

The resilient leg preferably contains polypropylene, polyvinyl chloride, acrylonitrile butadiene styrene, copolymers, and/or mixtures or metals, preferably aluminum, steel, or copper alloys, such as spring bronze or brass. In an advantageous embodiment, the resilient leg according to the invention is made of metal, preferably of a metal foil, and particularly preferably a foil made of aluminum, sheet steel alloys, or copper alloys, such as spring bronze.

The resilient leg preferably has, for the adjustment of the deflection characteristics, a profile thickness from 0.2 mm to 1 mm in the region provided for the deflection. The region provided for the deflection can be the connection point of the resilient leg to the holding rail or can extend over a part or the entire length of the resilient leg.

In an advantageous embodiment of the invention, the holding rail, the guide rail, and/or the resilient leg contain at least one stiffening insert. The stiffening insert can contain a metal, preferably a metal foil, and particularly preferably a foil made of aluminum alloys, sheet steel alloys, or copper alloys such as spring bronze or reinforcement fibers, preferably glass fibers, Kevlar fibers, or carbon fibers. The stiffening insert has the particular advantage that the material thicknesses for the holding rail and the resilient leg can be reduced and the stability or spring strength can remain the same or be increased.

The distance D between the bottom edge of the pane and the rear edge of the cover is preferably from 0.05 mm to 5 mm and particularly preferably from 0.1 mm to 2 mm. The distance acts in the motor vehicle hull as an optically invisible or hardly visible joint or even as a deliberate joint, that is visible for shape purposes. The rear edge of the cover is preferably implemented round, wedge-shaped, or rectangular. These designs permit, in particular, combining the necessity of a hardly visible joint with a sufficient production tolerance in the assembly of the sealing arrangement.

In an advantageous embodiment, the locking hook in the locking channel according to the invention is implemented rounded. The locking hook is preferably rounded such that, together with the projecting region of the locking rail it forms a swivel joint. By means of the articulated arrangement of the locking hook and of the locking rail, the locking rail can be inserted into the locking channel even at oblique angles in den locking channel and locked retaining the predetermined position.

In another preferred embodiment of the invention, the projecting regions on the locking rail are implemented only in segments. The segments without projecting regions can have a length from 5 mm all the way to 50 mm, preferably from 15 mm to 30 mm. At the time of assembly of the cover, the projecting region of the locking rail bends up a resilient leg of the holding rail. With the aforementioned segmentation, during the assembly process, one segment with a projecting region is always already locked before the next segment with a projecting region begins to bend the resilient leg upopen. The locking of a segment with a projecting region takes place in each case with an acoustic click that represents an effective control of a successful locking process.

In another advantageous embodiment of the invention, subsections of the locking rail are recessed. The recesses can be implemented as slits with a width from 0.5 mm to 2 mm. however, the recesses and the segments of the locking rail can also have a length from 2 mm all the way to 50 mm. An advantage of a segmented locking rail resides in the improved flexibility of the locking rail during the assembly process.

In a preferred embodiment, the holding rail is positioned relative to the pane with an assembly welt or a stationary guide element. In this case a "stationary guide element" means that an assembly aid for the holding rail has a stationary position relative to the position of the pane.

The assembly aid enables the precise positioning of the holding rail relative to the pane before the bonding of the parts. An assembly welt likewise means an assembly aid before the gluing of the parts. The assembly welt is a spacer relative to the pane edge that is insertable into the locking channel and then removable.

In a preferred embodiment, the locking rail of the cover recessed in subsections is latched into the locking channel in segments with slight bending. With the bending and latching of a segmented locking rail, a clearly perceptible acoustic click is generated. The acoustic click signals the latching and is quite helpful in the context of quality control of the locking.

In an advantageous embodiment of the method according to the invention, before the introduction of the guide rail into the guide channel, the guide rail is guided along on an assembly stop. This ensures that the guide rail and the guide channel as well as the locking rail and the locking channel are arranged relative to each other such that they slide into each other with a positive fit when the cover is lowered onto the holding rail. In particular, this prevents the locking rail from being introduced outside the locking channel and between the resilient leg and the pane, which can result in deformation and destruction of the resilient leg.

In another advantageous embodiment of the method according to the invention, the cover is connected to the holding rail in segments. This has the particular advantage that a clearly perceptible acoustic click is generated with the bending and latching of a segmented locking rail. The acoustic click signals latching and is quite helpful in the context of quality control of the locking.

Particularly preferably, the method is used for incorporation of a sealing arrangement in the lower region of a motor vehicle windshield.

The invention further comprises the use of the sealing arrangement in the lower region of a motor vehicle windshield and in the rear region of a cover, in particular of a water draining chamber cover.

It is understood that the different embodiments can be realized individually or in any combinations. In particular, the characteristics mentioned above and to be explained in the following can be used not only in the combinations indicated but also in other combinations or alone, without departing from the scope of the present invention.

The invention is explained in detail in the following with reference to drawings. The drawings are schematic depictions and not true to scale. The drawings in no way restrict the invention.

They depict.

Figure 1:
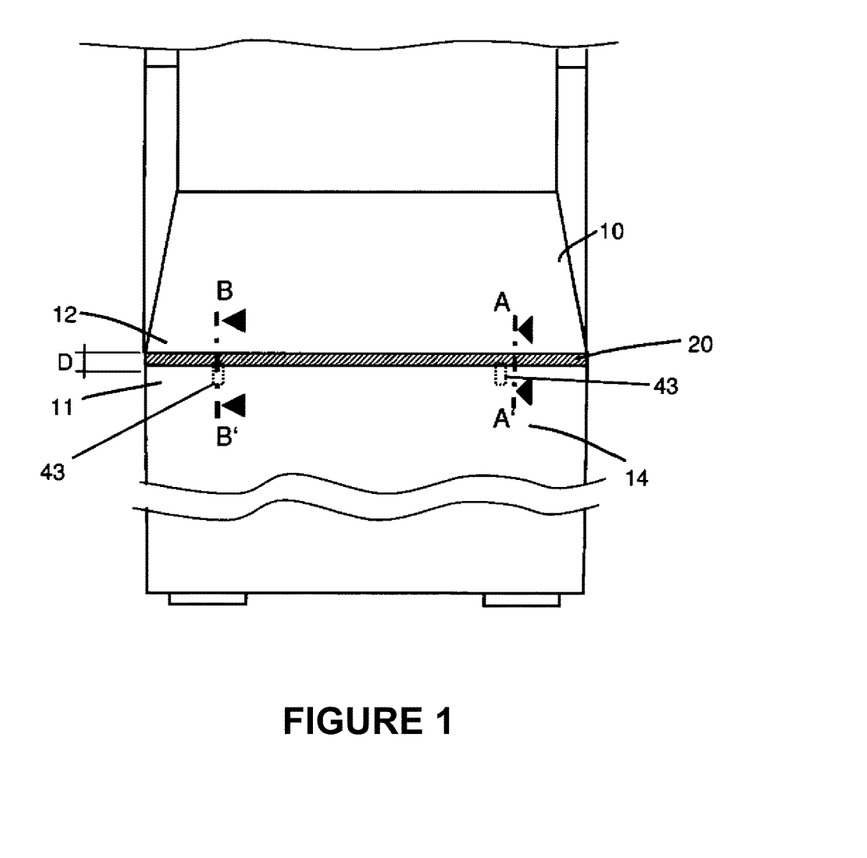
FIG. 1 a top plan view of a sealing arrangement according to the invention for a motor vehicle windshield, FIG. 2 a cross-section of a sealing arrangement according to the invention according to FIG. 1, FIG. 3a a detail of a cross-section of a cover according to the invention, FIG. 3b another detail of a cross-section of a holding rail according to the invention, FIG. 3c another detail of a cross-section of a sealing arrangement according to the invention according to FIG. 2, FIG. 4 a spatial representation of a cross-section of a sealing arrangement according to the invention, FIG. 5 a spatial representation of an exemplary embodiment of a cover according to the invention, FIG. 6 another cross-section of a sealing arrangement according to the invention according to FIG. 1, FIG. 7 a cross-section of another exemplary embodiment of the sealing arrangement according to the invention, and FIG. 8 a cross-section of a holding rail according to the invention rail with an assembly welt, and FIG. 9 a flowchart of an exemplary embodiment of the method according to the invention.

FIG. 1 depicts a top plan view of an embodiment of a sealing arrangement according to the invention for a pane 10. The pane 10 is, for example, the windshield of a motor vehicle. The bottom edge 12 of the pane 10 is connected to a cover 14 at a distance D of 0.3 mm via a holding rail 20. Inside the joint, a part of the holding rail 20 is depicted.

Figure 2:
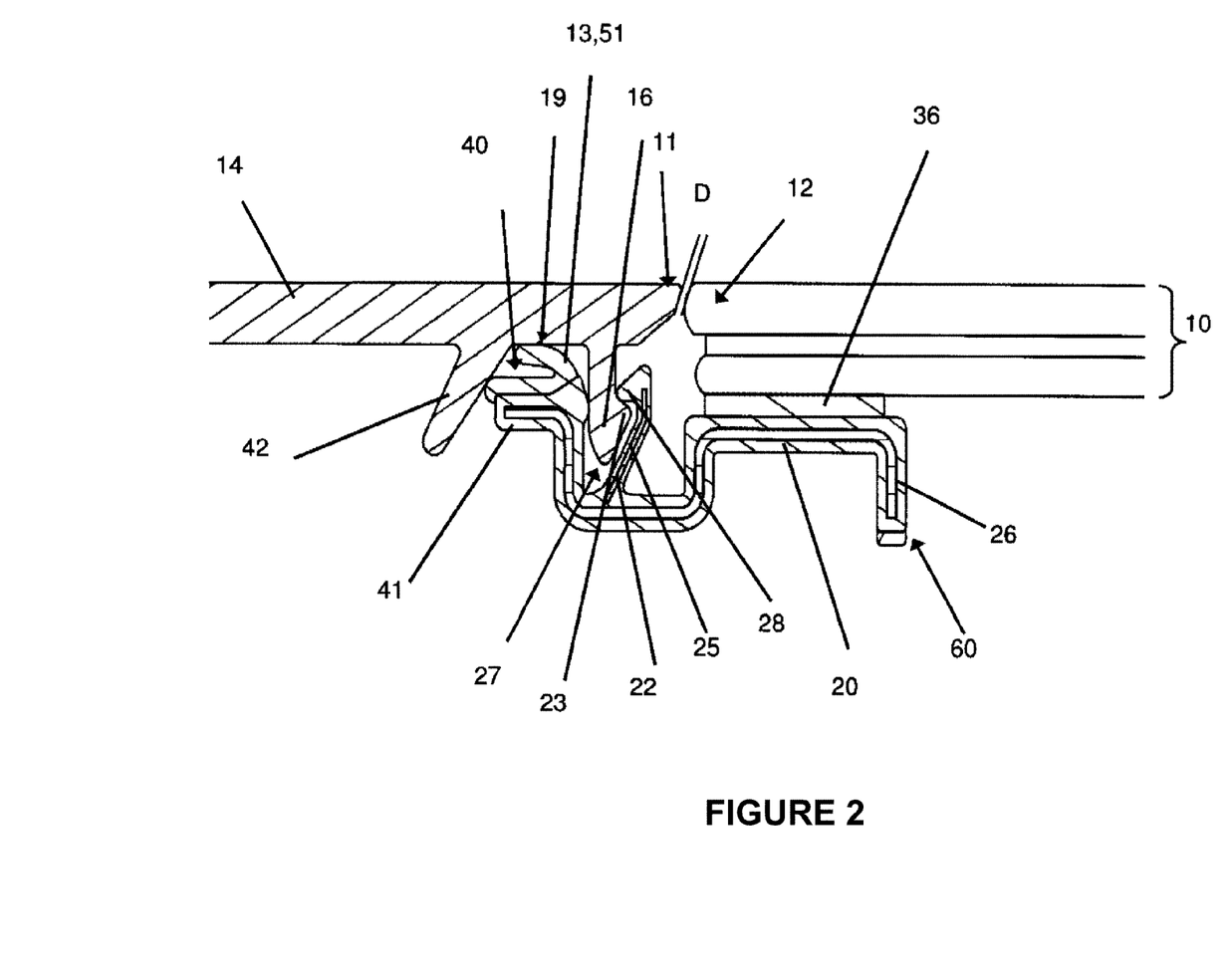

FIG. 2 depicts a cross-section of a sealing arrangement according to the invention along section line A-A' from FIG. 1. The pane 10 is connected to a cover 14 at the bottom edge 12 via a holding rail 20. The cover 14 is, for example, a water draining chamber cover or any other panel part in the region of the windshield of a motor vehicle. The pane 10 is, for example, a laminated safety glass pane made of two individual panes that are bonded to each other via a thermoplastic intermediate layer. The pane 10 can also be a single glass pane made of tempered safety glass, for example, with the use of the sealing arrangement according to the invention in a rear window.

The holding rail 20 contains a locking channel 27. One flank of the locking channel 27 is formed by the side of a guide rail 41 facing the pane 10. The opposite flank is formed by a resilient leg 25. A locking hook 28 is arranged on the resilient leg 25 in the direction of the interior of the locking channel 27.

The holding rail 20 contains a polymer and is made, for example, of polypropylene. The holding rail 20 is bonded to the inner side of the pane 10 on its bottom edge 12 by means of a 0.8-mm-thick adhesive connection 36 with an acrylic adhesive.

The cover 14 contains a polymer and is made, for example, of polypropylene. The cover 14 contains a locking rail 16 with a projecting region 23 directed toward the pane 10. The locking rail 16 forms a guide channel 40 with the positioning stop 42. The positioning stop 42 is arranged on the side of the guide channel 40 facing away from the pane 10.

The guide rail 41 of the holding rail 20 is arranged in the guide channel 40 of the cover 14. This defines the lateral distance D of the cover 14 from the pane 10. Here, "lateral" means the direction of the surface of the pane 10 beyond its bottom edge 12 to the cover 14. The mean distance D between the edge on the bottom edge 12 of the pane 10 and the rear edge 11 of the cover 14 is, for example, 0.3 mm. A open gap without sealing material is situated between the rear edge 11 of the cover 14 and the edge on the bottom edge 12 of the pane 10.

Moreover, the locking rail 16 of the cover 14 is latched in the locking channel 27 of the holding rail 20. For this, during assembly of the cover 14, a resilient element 13 is compressed between the guide rail 41 and the stop face 19 of the cover 14. The resilient element 13 is in a tensioned state 51 and presses permanently against the stop face 19 on the bottom of the guide channel 40 of the cover 14. Thus, a projecting region 23 of the locking rail 16 is pulled against a locking hook 28. The locking hook 28 is implemented as a lip on the resilient leg 25. By means of the tensile loading of the projecting region 23 of the locking rail 16 against the locking hook 28, a secure fastening of the cover 14 in the holding rail 20 is obtained. In particular, the cover 14 is secured against sliding out opposite the assembly direction. Here, "assembly direction" means the direction in which the locking rail 16 is inserted into the locking channel. The secure positioning ensures that the surfaces in the bottom region of the pane 10 and in the rear region of the cover 14, for example, remain arranged in a line.

The resilient leg 25 is, after locking with the locking rail 16, stressed only with tensile force and absorbs no transverse forces. Transverse forces are absorbed by a defined positioning of the guide rail 41 in the guide channel 40. Consequently, the resilient leg 25 can be implemented very thin. Only low forces are required to lock the locking rail 16 in the locking channel 27. The profile thickness in the connection region 22 between the resilient leg 25 and the holding rail 20 is, for example, 0.5 mm.

The locking channel 27 is only filled by the locking rail 16 to, for example, roughly 50% of its depth. The locking hook 28 holds the locking rail 16 under the pressure of the resilient element 13 and of the resilient leg 25 durably in a defined locking position of the locking channel 27.

The resilient element 13 is made, for example, of ethylene propylene diene rubber. By means of the large spring travel of the resilient element 13, it is possible, even with large tolerances of the locking rail 16 and the holding rail 20, to obtain secure locking at the time of assembly. At the same time, the elastic material of the resilient element 13 seals the guide channel 40 against moisture and water. Consequently, water that penetrates into the region between the pane 10 and the cover 14 cannot penetrate via the guide channel 40 into the region below the cover 14. Thus, it is possible, for example, to dispense with other additional sealing measures.

The resilient leg 25 and the holding rail 20 can contain a stiffening insert 26, for example, an insert made of aluminum foil.

A support leg 60 can be arranged on the holding rail 20 in the region below the pane 10. The support leg 60 serves to fix the distance between the pane 10 and a crossmember of a motor vehicle (not shown) onto which the pane 10 is glued. The support leg 60 serves in particular to maintain the distance during the setting of the adhesive.

An optional supporting bulge 15 durably holds the locking rail 16 under the pressure of the resilient element 13 and of the resilient leg 25 in a defined locking position in the locking channel 27. The supporting bulge 15 is implemented as a lip on the guide rail 41. The supporting bulge 15 and the projecting region 23 of the locking rail 16 are implemented rounded such that locking is obtained regardless of the multidimensional curvature of the pane 10.

Figure 3A:
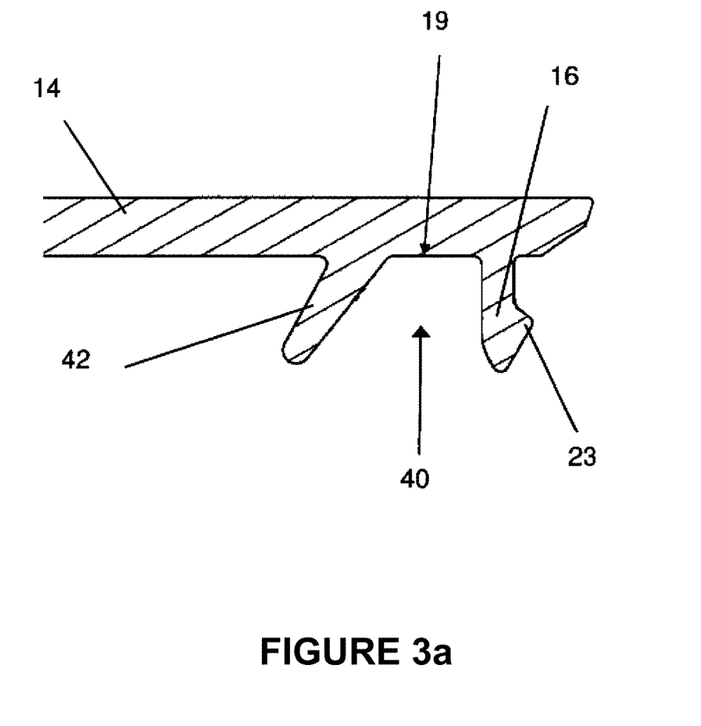

FIG. 3a depicts a detail of a cross-section of the cover 14 from FIG. 2. The positioning stop 42, the stop face 19 on the underside of the cover 14, and the locking rail 16 form a trapezoid-shaped guide channel 40. A projecting region 23 is arranged on the side of the locking rail 16 facing away from the guide channel 40.

Figure 3B:
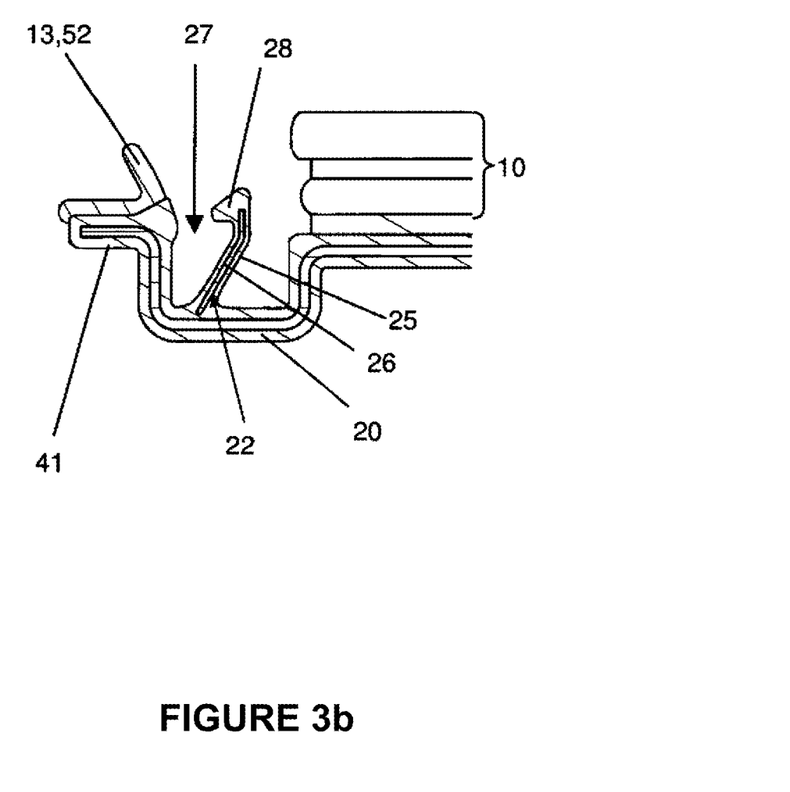

FIG. 3b depicts a detail of a cross-section of the holding rail 20 from FIG. 2 before locking with a cover 20 (not shown). The resilient element 13 is in a relaxed state 52. The guide rail 41 forms a locking channel 27 with the resilient leg 25. A locking hook 28 is formed on the side of the resilient leg 25 facing the locking channel 27. The resilient leg 25 and the holding rail 20 can contain a stiffening insert 26.

Figure 3C:
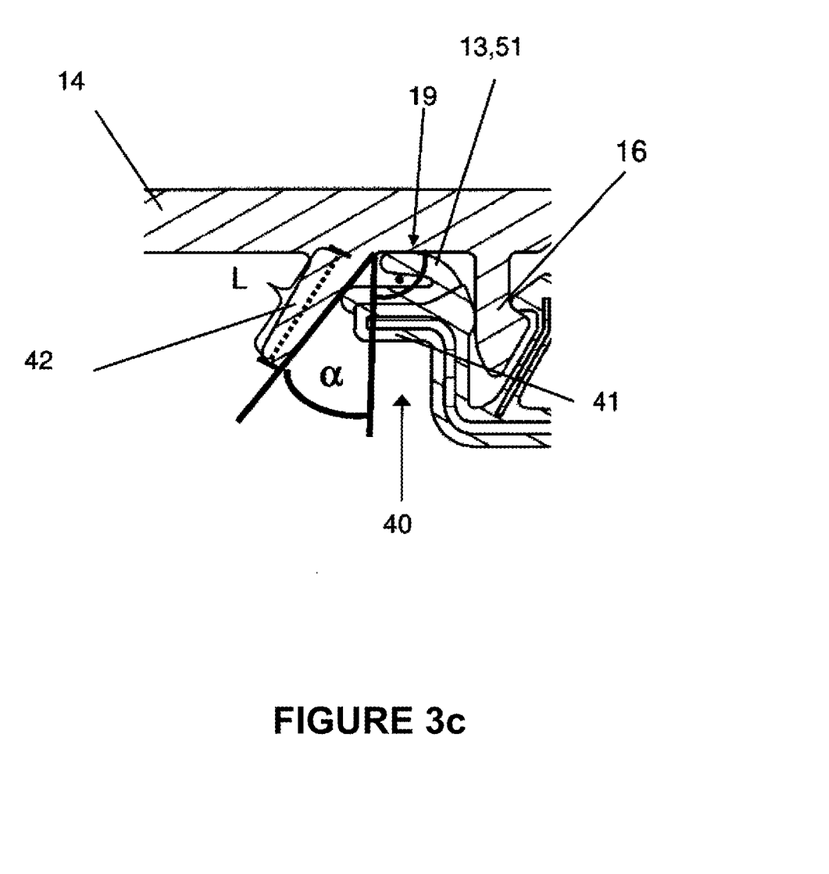

FIG. 3c depicts a detail of the cross-section from FIG. 2 in the region of the positioning stop 42. The positioning stop 42 forms an angle α of, for example, 15° with the perpendicular to the stop face 19 of the cover 14. The positioning stop 42 has, for example, a length L of 4 mm. The locking rail 16 is, for example, arranged on the side facing the guide channel 40 perpendicular to the stop face 19.

Figure 4:
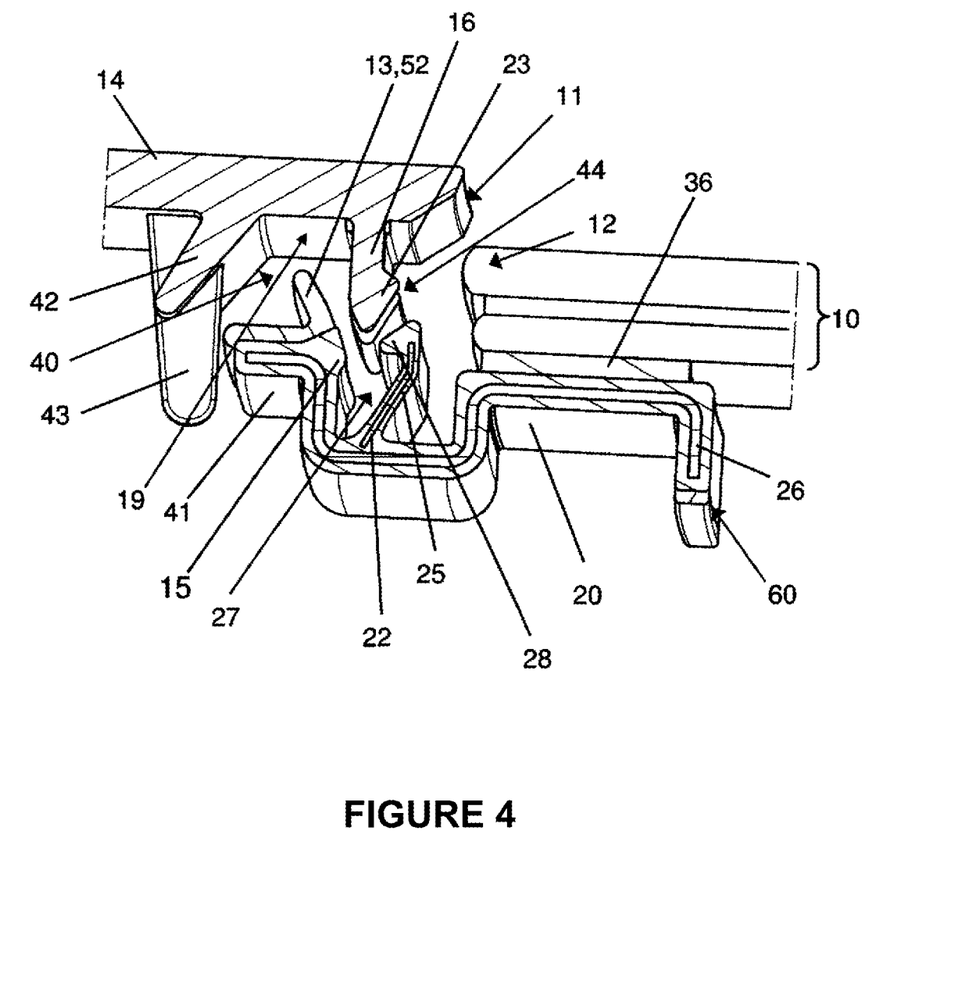

FIG. 4 is a perspective representation of a cross-section in the region of an assembly stop 43 from FIG. 1. The holding rail 20 and the cover 14 are not yet locked together. The resilient element 13 is a U-shaped supporting and sealing lip and is in a relaxed state 52.

The assembly stop 43 is arranged in a small region of the positioning stop 42 and has a depth of, for example, 4 mm. The assembly stop 43 protrudes beyond the positioning stop 42 more than 50% and has, for example, a length of 15 mm. The angle of the assembly stop 43 relative to the perpendicular to the stop face 19 of the cover 14 is less than the angle α between the positioning stop 42 and the perpendicular. The assembly stop is arranged, in particular, perpendicular to the stop face 19 or inclined at an angle of, for example, 1° to 20° relative to the guide channel 40.

Figure 5:
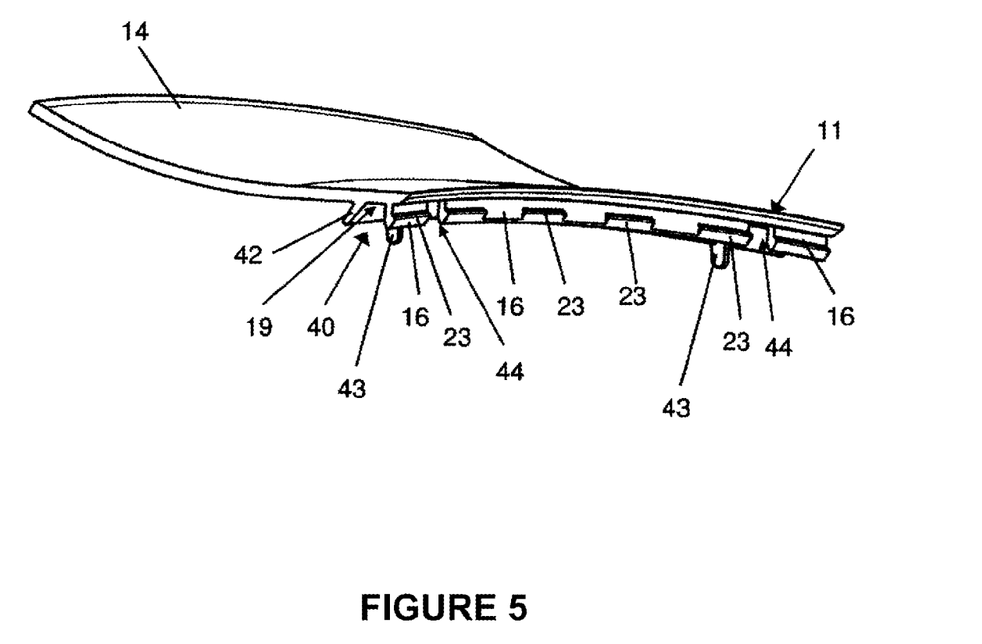

FIG. 5 is a perspective representation of an embodiment of the cover 14 according to the invention. The locking rail 16 has, for example, two slit-shaped recesses 44. The recesses 44 are in each case arranged opposite an assembly stop 43 arranged on the opposite leg of the guide channel 40. Moreover, the locking rail 16 has subregions with a projecting region 23 and subregions without a projecting region 23. The locking rail 16 is implemented without a locking function in the subregions without a projecting region 23. This has the particular advantage that the assembly of the cover 14 in the holding rail 20 takes place by segments and at the time of the locking of a subregion, a clear acoustic click can be perceived. At the same time, the locking process can be discerned tactilely by the assembler.

Figure 6:
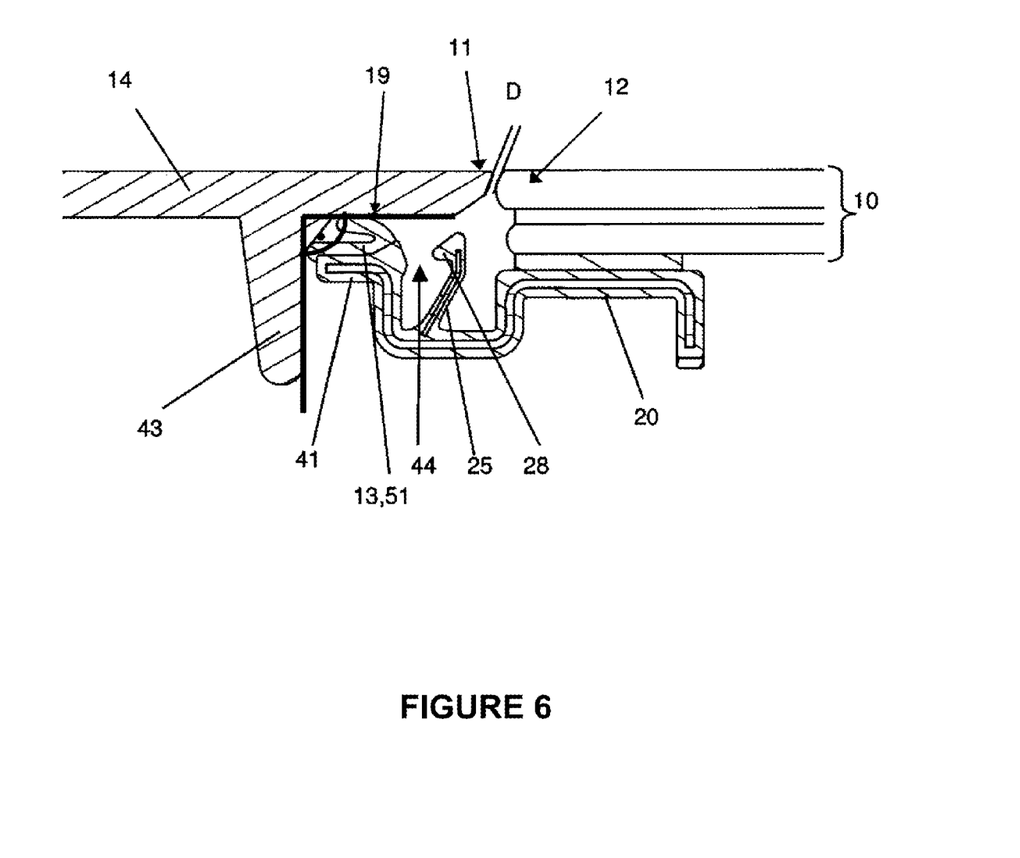

FIG. 6 depicts a cross-section in the region of an assembly stop 43 along the section line B-B' of FIG. 1. The assembly stop 43 is, for example, arranged perpendicular to the stop face 19 on the underside of the cover 14. A recess 44 in the locking rail 16 is situated on the side of the guide channel 40 facing the pane. The recess 44 has the particular advantage that, for example, in the case of injection molding of the cover 14, a tool for forming the assembly stop 43 can engage through the recess 44 and can be released. This enables particularly simple and economical production of the cover 14 according to the invention.

Figure 7:
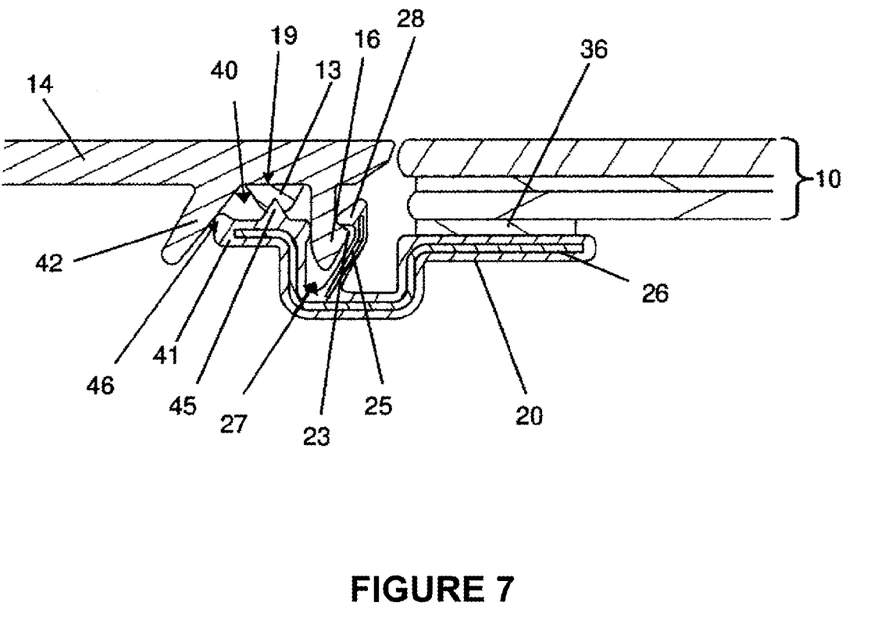

FIG. 7 depicts a cross-section of an alternative embodiment of a sealing arrangement according to the invention. In contrast to FIG. 2, the resilient element 13 is implemented as a solid material. Moreover, the resilient element 13 is connected to the stop face 19 in the guide channel 40 of the cover 14. The guide rail 41 has, in the region of the resilient element 13, a peak-shaped bulge 45. The peak-shaped bulge 45 is pressed into the resilient element 13 and forms a secure seal against moisture and water. The guide rail 41 has a supporting bulge 46 that contacts the positioning stop 42. This enables precise lateral positioning of the guide rail 41 in the guide channel 40.

Figure 8:
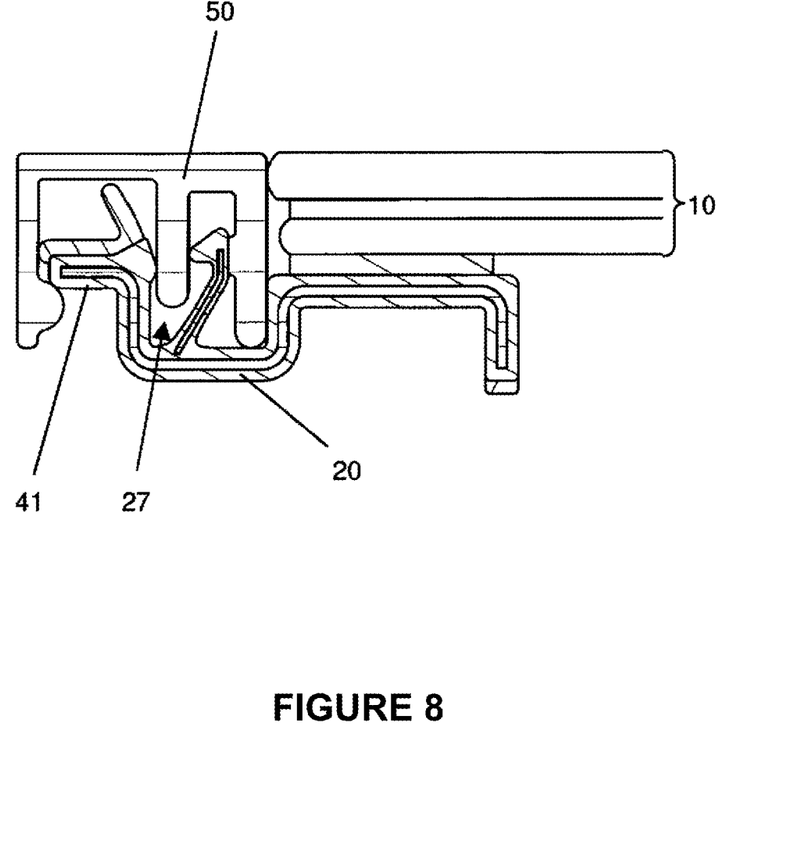

FIG. 8 depicts a cross-section of a holding rail 20 on a pane 10 with an assembly welt 50 according to the invention. The assembly welt 50 is positioned stationarily relative to the pane 10. Here, "stationarily" means that it has a stationary position relative to the position of the pane 10. The assembly welt 50 enables precise positioning of the holding rail 20 relative to the pane 10 before the gluing of the holding rail 20 and the pane 10. The assembly welt 50 is introduced into the locking channel 27 and is suitable to accommodate the guide rail 41. The assembly welt 50 can remain on the holding rail 20 during the transport of the pane 10 to the final assembly on the motor vehicle and protect the holding rail 20 against damage. The assembly welt 50 can then be removed, for example, shortly before assembly of the cover 14. The assembly welt 50 can, in particular, be removed without a great expenditure of force.

Figure 9:
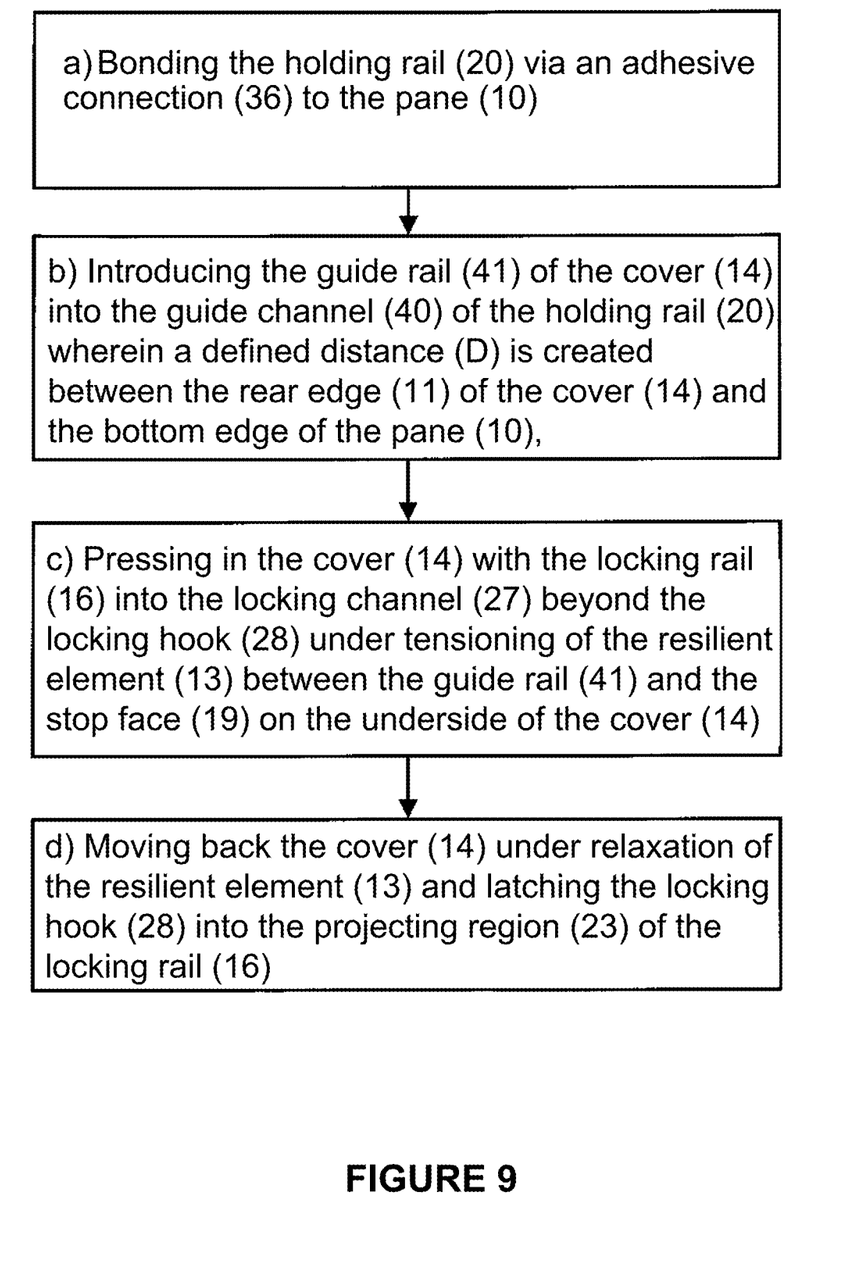

FIG. 9 explains in detail the steps of the method according to the invention for producing a sealing arrangement. In a first step, the holding rail 20 is durably bonded to a pane 10 by an adhesive connection 36 on the bottom edge 12 of the pane 10. For this, for example, an assembly welt 50 that defines the position of the holding rail 20 relative to the bottom edge of the pane 10 is used.

In a next step, the cover 14 is placed on the pane 10. For this, for example, one side of the cover 14 is placed on the holding rail 20 such that an assembly stop 43 of the cover 14 contacts the guide rail 41 of the holding rail 20. The use of an assembly stop 43 ensures that the guide rail 41 and the guide channel 40 as well as the locking rail 16 and the locking channel 27 are arranged relative to each other such that upon the lowering of the cover 14 onto the holding rail 20, they slide into one another with a positive fit. In particular, this prevents the locking rail 16 from being introduced outside the locking channel 27 and between the resilient leg 25 and the pane 10. This can result in deformation and destruction of the resilient leg 25.

In another step, the cover 14 is lowered onto the holding rail 20. The guide rail 41 of the cover 14 is introduced into the guide channel 40 of the holding rail 20. Thus, the rear edge 11 of the cover 14 and the bottom edge 12 of the pane 10 assume a defined distance D relative to each other.

In another step, the cover 14 with the locking rail 16 is introduced into the locking channel 27. The projecting region 23 of the locking rail 16 is pressed beyond the locking hook 28 under tensioning of the resilient element 13. The resilient leg 25 is implemented such that the locking hook 28 can be diverted, during the pressing in, by rotation of the resilient leg 25 around the connection point 22 to the holding rail 20 in the direction of the pane 10. After the projecting region 23 has been pressed beyond the locking hook 28, the resilient leg 25 relaxes, and moves the locking hook 28 in the direction of its original position. This results in an interlocking of locking hook 28 and a projecting region 23.

In another step, the cover 14 is moved back against the assembly direction and the resilient element 13 is partially relaxed. The projecting region 23 exerts tension on the resilient leg 25 via the locking hook 28, by which means the vertical position of the cover 14 relative to the holding rail 20 and to the pane 10 is defined.

The present invention has several advantages compared to arrangements according to the prior art. In sealing arrangement according to the prior art, both the lateral distance D between the cover and the pane and the vertical distance between the cover and the pane are defined by the locking. The locking means according to the prior art must be elastic in order to enable locking on the one hand and sealing of the arrangement on the other. This results in positioning inaccuracies and unwanted tolerances.

With the sealing arrangement according to the invention, the locking mechanism that is formed by the locking channel 27 and the locking rail 16 is separate from the positioning by the guide channel 40 and the guide rail 41. The guide channel 40 and the guide rail 41 define the distance D between the cover 14 and the pane 10. The locking mechanism fixes the cover 14 and the holding rail 20 and, thus, the guide rail 41 in the guide channel 40. Since the locking rail 16 and the resilient leg 25 are stressed only by tensile stress, they can be designed thinner and more space-saving than in the prior art. The result is an unexpected combination of saving of space, high positioning accuracy, and simple assembly. The high demands on production tolerances and assembly can be met substantially better. In addition, by means of the elastic resilient element 13 in the guide channel 40, improved sealing of the arrangement is achieved, as a result of which additional sealing measures can be dispensed with. These advantages were unexpected and surprising for the person skilled in the art.

LIST OF REFERENCE CHARACTERS 10 pane
11 rear edge of the cover 14
12 bottom edge of the pane 10
13 resilient element, supporting and sealing lip
14 cover
15 supporting bulge
16 locking rail
19 stop face
20 holding rail
22 connection point between resilient leg 25 and holding rail 20
23 projecting region
25 resilient leg
26 stiffening insert
27 locking channel
28 locking hook
36 adhesive connection
40 guide channel
41 guide rail
42 positioning stop
43 assembly stop
44 recess
45 bulge
46 supporting bulge
50 assembly welt
51 resilient element 13 in the tensioned state
52 resilient element 13 in the relaxed state
60 support leg
A-A' section line
B-B' section line
D distance between the rear edge of the cover 11 and the bottom edge 12 of the pane 10
L length of the positioning stop 42

The invention claimed is:

1. A sealing arrangement for a motor vehicle pane, comprising at least:
a holding rail having a locking channel that is formed by a guide rail and a resilient leg, wherein the holding rail is fastened to a pane, and
a cover having a guide channel that is formed by a locking rail and a positioning stop, wherein
the guide rail is arranged in the guide channel and the locking rail is latched in the locking channel, wherein a locking hook is arranged on the resilient leg in a projecting region of the locking rail, and
a resilient element is clamped in the guide channel between a stop face on the underside of the cover and the guide rail.

2. The sealing arrangement according to claim 1, wherein the resilient element is connected to the guide rail or to the stop face.

3. The sealing arrangement according to claim 1, wherein the resilient element is implemented as a solid material, as a hollow chamber profile, or as a U-shaped profile.

4. The sealing arrangement according to claim 1, wherein the resilient element contains elastomers, thermoplastic elastomers, and preferably ethylene propylene diene rubber, styrene butadiene rubber, polybutadiene rubber, nitrile rubber, chloroprene rubber, fluorinated rubber, silicone rubber, polypropylene, polyvinyl chloride, acrylonitrile butadiene styrene, copolymers, and/or mixtures thereof.

5. The sealing arrangement according to claim 1, wherein the guide channel has at least one assembly stop.

6. The sealing arrangement according to claim 1, wherein the resilient leg is deflectable or is deflectably connected to the holding rail.

7. The sealing arrangement according to claim 1, wherein the resilient leg has, in the region provided for the deflection, a thickness of 0.2 mm to 1 mm.

8. The sealing arrangement according to claim 1, wherein an angle between the positioning stop and the perpendicular to the stop face is from 0° to 45°.

9. The sealing arrangement according to claim 1, wherein the holding rail and/or the guide rail contains at least one reinforcement insert.

10. The sealing arrangement according to claim 1, wherein, in the region provided for the deflection, the resilient leg contains a metal foil or is preferably made from a metal foil.

11. The sealing arrangement according to claim 1, wherein the locking rail has, in subsections, recesses and/or, in subsections, no projecting regions.

12. The sealing arrangement according to claim 5, wherein the guide channel has three to seven assembly stops.

13. The sealing arrangement according to claim 5, wherein the angle between the positioning stop and the perpendicular to the stop face is from 2° to 25°.

14. A method for producing the sealing arrangement according to claim 1, comprising:
 a) durably bonding the holding rail to the pane by an adhesive connection,
 b) introducing the guide rail of the cover into the guide channel of the holding rail, and creating a defined distance between the rear edge of the cover and the bottom edge of the pane,
 c) pressing the cover with the locking rail into the locking channel beyond the locking hook under tensioning of the resilient element between the guide rail and the stop face on the underside of the cover,
 d) moving the cover back under relaxation of the resilient element and latching the locking hook into the projecting region of the locking rail.

15. The method according to claim 14, wherein in step (b) the guide rail is guided along on an assembly stop.

16. The method according to claim 14, wherein the cover is connected, in segments, to the holding rail.

17. A method comprising:
 providing the sealing arrangement according to claim 1, and using the sealing arrangement in a motor vehicle pane.

18. The method according to claim 17, wherein the motor vehicle pane is chosen from a windshield or a rear window.

19. The method according to claim 17 wherein the cover is a water draining chamber cover.

* * * * *